United States Patent
Flock (10) Patent No.: US 9,541,114 B2
(45) Date of Patent: Jan. 10, 2017

(54) FASTENING ELEMENT AND METHOD FOR MOUNTING SAME

(71) Applicant: Johnson Controls Technology Company, Holland, MI (US)

(72) Inventor: Dustin Flock, Köln (DE)

(73) Assignee: Johnson Controls Technology Company, Holland, MI (US)

( * ) Notice: Subject to any disclaimer, the term of this patent is extended or adjusted under 35 U.S.C. 154(b) by 105 days.

(21) Appl. No.: 14/374,487

(22) PCT Filed: Jan. 23, 2013

(86) PCT No.: PCT/EP2013/051184
§ 371 (c)(1),
(2) Date: Jul. 24, 2014

(87) PCT Pub. No.: WO2013/110630
PCT Pub. Date: Aug. 1, 2013

(65) Prior Publication Data
US 2014/0348615 A1    Nov. 27, 2014

(30) Foreign Application Priority Data

Jan. 25, 2012 (DE) .......................... 10 2012 201 041
Mar. 16, 2012 (DE) .......................... 10 2012 204 187

(51) Int. Cl.
*F16B 19/02*    (2006.01)
*B29C 65/44*    (2006.01)
(Continued)

(52) U.S. Cl.
CPC ............... *F16B 19/02* (2013.01); *B29C 65/44* (2013.01); *B29C 66/474* (2013.01);
(Continued)

(58) Field of Classification Search
CPC ........ F16B 13/002; F16B 19/086; F16B 19/02
(Continued)

(56) References Cited

U.S. PATENT DOCUMENTS 3,188,905 A * 6/1965 Millet ................... F16B 19/086
411/48
3,515,419 A    6/1970 Baugh
(Continued)

FOREIGN PATENT DOCUMENTS

CN    2553162 Y    5/2003
DE    17 81 630 U    1/1959
(Continued)

OTHER PUBLICATIONS

Office Action dated Aug. 18, 2015, in corresponding European application No. 13 701 971.7, 4 pages.
(Continued)

*Primary Examiner* — Flemming Saether
(74) *Attorney, Agent, or Firm* — Foley & Lardner LLP (57) ABSTRACT

A fastening element for positive, materially integral and/or non-positive arrangement on or in a fiber composite component includes a sleeve-like portion, on the first end of which there is formed a tapering conical or cone-shaped portion in which a plurality of slots are made which are aligned in the direction of a longitudinal extent of the fastening element and in this way subdivide the conical or cone-shaped portion into individual segments. On the second end of the sleeve-like portion, there is arranged a holding portion which is angled at a right angle from the sleeve-like portion and in this way enlarges an outer diameter of the sleeve-like portion and forms planar bearing surfaces. A method is also described for mounting a fastening element.

8 Claims, 5 Drawing Sheets

(51) Int. Cl.
*B29C 65/00* (2006.01)
*F16B 19/08* (2006.01)
*F16B 37/06* (2006.01)
*F16B 43/00* (2006.01)
*B29C 65/56* (2006.01)

(52) U.S. Cl.
CPC .... *B29C 66/72141* (2013.01); *B29C 66/7392* (2013.01); *F16B 19/08* (2013.01); *F16B 19/086* (2013.01); *F16B 37/065* (2013.01); *F16B 43/00* (2013.01); *B29C 65/561* (2013.01); *B29C 65/562* (2013.01); *B29C 66/7212* (2013.01); *B29C 66/8322* (2013.01)

(58) Field of Classification Search
USPC ...................................................... 411/29, 30
See application file for complete search history.

(56) References Cited

U.S. PATENT DOCUMENTS

| | | | |
|---|---|---|---|
| 3,919,916 A | 11/1975 | Alexander | |
| 5,533,851 A * | 7/1996 | Remmers | F16B 19/1081 411/344 |
| 6,862,864 B2 * | 3/2005 | O'Banion | B21J 15/025 29/525.03 |
| 8,764,364 B2 * | 7/2014 | Brown | F16B 13/003 248/304 |
| 2010/0003102 A1 | 1/2010 | Nagaiwa et al. | |

FOREIGN PATENT DOCUMENTS

| | | |
|---|---|---|
| DE | 17 04 771 A1 | 2/1971 |
| DE | 2020090 07 585 U1 | 9/2009 |
| DE | 1020090 56 580 A1 | 5/2011 |
| EP | 1 099 866 A2 | 5/2001 |
| EP | 1 158 186 A1 | 11/2001 |
| FR | 2582756 A1 | 12/1986 |
| GB | 0 618 033 A | 2/1949 |
| GB | 1 221 507 A | 2/1971 |
| JP | 2007-162838 A | 6/2007 |
| WO | WO-03/001075 A1 | 1/2003 |

OTHER PUBLICATIONS

Office Action dated Aug. 4, 2015, in corresponding Japanese Application No. 2014-553690, 3 pages.
Office Action dated May 5, 2015, in corresponding Chinese Application No. 201380006725.5, 8 pages.
International Search Report dated Apr. 23, 2013 in PCT/EP2013/051184.
Office Action dated Oct. 11, 2012 in corresponding German Application No. 10 2012 204 187.7.

* cited by examiner

FASTENING ELEMENT AND METHOD FOR MOUNTING SAME

CROSS REFERENCE TO RELATED APPLICATIONS

The present application is a U.S. National Stage of International Application No. PCT/EP2013/051184 filed on Jan. 23, 2013, which claims the benefit of German Patent Application Nos. 10 2012 201 041.6 filed on Jan. 25, 2012 and 10 2012 204 187.7 filed on Mar. 16, 2012, the entire disclosures of all of which are incorporated herein by reference.

The invention relates to a securing element for positive-locking, materially engaging and/or non-positive-locking arrangement on or in a composite fiber component. Furthermore, the invention relates to a method for assembling a securing element.

BACKGROUND

In the prior art, connection elements are fitted to composite fiber components by means of screwing, riveting and/or adhesive bonding. Such composite fiber components are, for example, fiber-reinforced thermoplastic plates.

EP 1 158 186 A1 describes a securing element which is constructed as a hollow rivet and which has an inner thread and a polygonal cross-section. The securing element has a sleeve-like portion at one end of which there is arranged a retention portion which is bent away from the sleeve-like portion and consequently increases an outer diameter of the sleeve-like portion and forms planar abutment faces.

DE 1 781 630 U discloses a rivet which comprises two portions. The first portion is formed by a hollow cylinder having an upper end and an end which is intended to be flanged. The second portion comprises a cylindrical rod whose outer diameter corresponds to the inner diameter of the rivet. The rod has at one end a conical expansion whose largest diameter corresponds to the outer diameter of the rivet.

U.S. Pat. No. 3,515,419 A discloses a two-part securing element which comprises a pin and a sleeve which is intended to be arranged in a workpiece. The pin is retained in the sleeve in a non-positive-locking manner.

BRIEF SUMMARY

An object of the present invention is to provide an improved securing element for positive-locking, materially engaging and/or non-positive-locking arrangement on a composite fiber component and an improved method for the assembly thereof.

With regard to the securing element for positive-locking, materially engaging and/or non-positive-locking arrangement on or in a composite fiber component, the object is achieved as described herein.

With regard to the method for assembling a securing element, the object is achieved as described further herein.

Advantageous developments of the invention are described further herein.

The securing element for positive-locking, materially engaging and/or non-positive-locking arrangement on or in a composite fiber component comprises according to the invention a sleeve-like portion, at the first end of which there is formed an acutely tapering conical or cone-like portion in which there are formed a plurality of slots which are orientated in the direction of a longitudinal extent of the securing element and which thereby subdivide the conical or cone-like portion into individual segments and at whose second end there is arranged a retention portion which is bent at right-angles away from the sleeve-like portion and which thereby increases an outer diameter of the sleeve-like portion and forms planar abutment faces.

By means of a securing element according to the invention, it is possible to transmit high forces which occur, for example, in vehicle seats in the event of a crash. Conventional connection elements have to either be embedded in the composite fiber component in a complex manner during the production process thereof or be arranged on the composite fiber component by means of screwing using a drilling process, with the fibers of the composite fiber component being destroyed. Using a securing element according to the invention, there is enabled between the securing element and composite fiber component a positive-locking, materially engaging and/or non-positive-locking bond which does not destroy fibers, in particular with a force transmission between the securing element and composite fiber component being significantly improved.

In a transition region between the sleeve-like portion and the conical or cone-like portion there is advantageously formed a material weakening which is formed in a particularly preferred manner as a perforation and/or a cross-section reduction. Bending of the individual segments of the conical or cone-like portion is thereby advantageously promoted.

In a particularly advantageous construction variant, an inner thread is formed on or in the sleeve-like portion so that a conventional screw can be arranged as a securing means directly in the securing element.

In another advantageous construction variant, there is formed at the outer side in the region of the sleeve-like portion a surface structure which is constructed in a particularly preferred manner as a grain and/or corrugation. Such a surface structure enables a particularly durable and resilient connection between the molten thermoplastic matrix of the composite fiber component and the sleeve-like portion of the securing element according to the invention.

In the method for assembling a securing element, the securing element according to the invention is heated to a predeterminable temperature which is above a melting temperature of the thermoplastic matrix of the composite fiber component and in the heated state is pushed or pressed through a composite fiber component in such a manner that an abutment face of a retention portion of the securing element is in planar abutment with a side of the composite fiber component and a conical or cone-like portion of the securing element protrudes beyond the composite fiber component at the other side. In this instance, the thermoplastic matrix is melted while the hot securing element is pressed through and forms during cooling a positive-locking, materially engaging and/or non-positive-locking connection with the securing element.

There is thereby formed between the securing element and composite fiber component a particularly robust and resistant positive-locking, materially engaging and/or non-positive-locking connection by means of which large forces can be introduced into the composite fiber component.

While the hot securing element is pressed through the composite fiber component, the fibers of the composite fiber component are urged through the conical or cone-like portion of the securing element so as not to be destroyed in such a manner that they are positioned around the sleeve-like portion of the securing element and a new fiber orientation is thereby formed. In this instance, this new fiber orientation enables a particularly advantageous force path and improved introduction of force from the securing element into the composite fiber component.

In a first construction variant, there is introduced into the sleeve-like portion a screw whose shaft presses apart individual segments of the conical or cone-like portion, which, when the structural element to be secured is subsequently arranged and a nut is screwed onto the shaft of the screw, are deformed to such an extent that they are bent at right-angles away from the sleeve-like portion and thereby increase an outer diameter of the sleeve-like portion and form planar abutment faces. The individual segments of the conical or cone-like portion in the bent state may advantageously replace a conventional washer.

In an alternative construction variant, the individual segments of the conical or cone-like portion are bent by means of a mandrel, wherein there is formed on or in the sleeve-like portion of the securing element an inner thread into which there is screwed a conventional screw whose screw head presses the structural element to be secured in a planar manner against an abutment face formed by the individual segments of the conical or cone-like portion.

By means of such a connection, it is possible to transmit high forces which occur, for example, in car seats in the event of a crash. Conventional connection elements have to either be embedded in the composite fiber component in a complex manner during the production process thereof or be arranged on the composite fiber component by means of screwing using a drilling process, with the fibers of the composite fiber component being destroyed. The method according to the invention enables between the securing element and composite fiber component a positive-locking, materially engaging and/or non-positive-locking bond which does not destroy fibers, in particular with a force transmission between the securing element and composite fiber component being significantly improved.

BRIEF DESCRIPTION OF THE DRAWINGS

Embodiments of the invention are explained in greater detail below with reference to drawings, in which.

DETAILED DESCRIPTION

Components which correspond to each other are given the same reference numerals in all the drawings.

Figure 1:
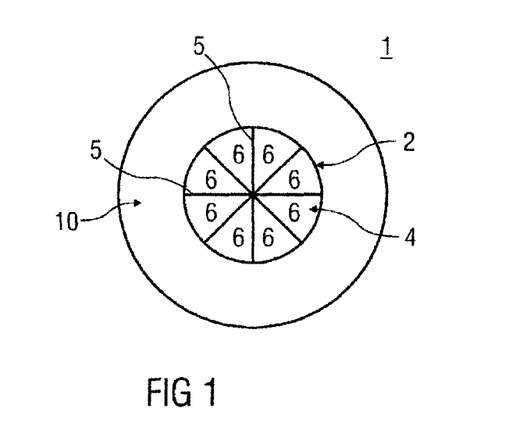
FIG. 1 is a schematic plan view of a securing element according to the invention.

FIG. 1 is a schematic plan view of a securing element 1 according to the invention.

Figure 2:
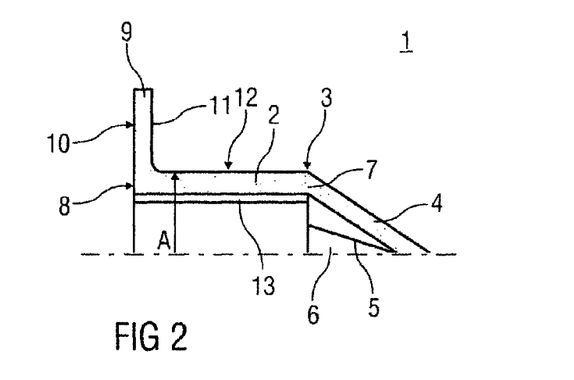
FIG. 2 is a schematic sectioned view of a securing element according to the invention.

FIG. 2 is a schematic sectioned view of a securing element 1 according to the invention in a non-assembled state.

The securing element 1 according to the invention has a sleeve-like portion 2 in the central region thereof.

At a first end 3 of the sleeve-like portion 2, an acutely tapering conical or cone-like portion 4 is formed. In this conical or cone-like portion 4, there are formed a plurality of slots 5 which are orientated in the direction of a longitudinal extent of the securing element 1 and thereby subdivide the conical or cone-like portion 4 into individual segments 6.

The segments 6 preferably have a triangular formation.

Figure 2A:
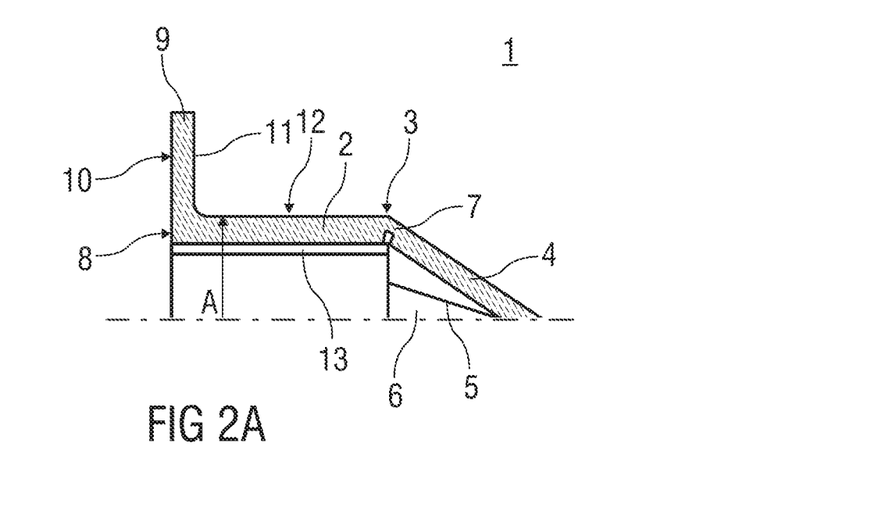
FIG. 2A is a schematic sectioned view of a securing element according to one embodiment.
Figure 2B:
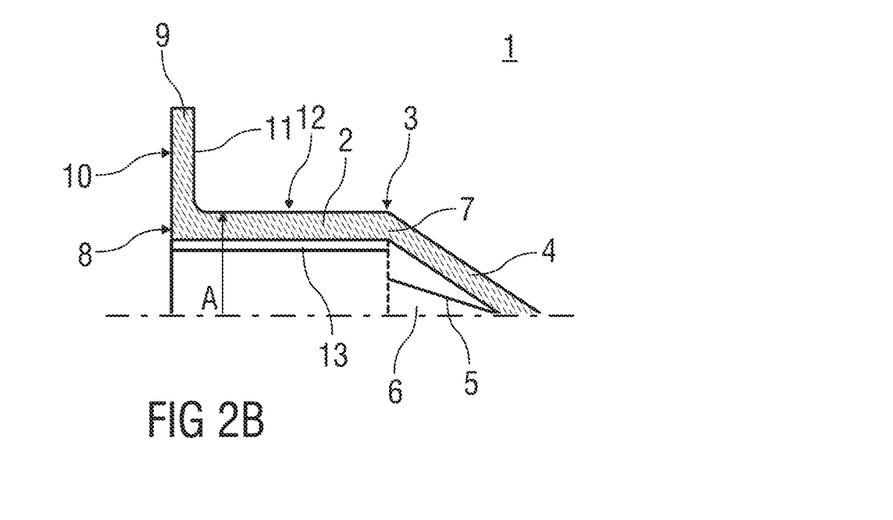
FIG. 2B is a schematic sectioned view of a securing element according to another embodiment.

In a particularly advantageous construction variant which is not illustrated in greater detail, in a transition region 7 between the sleeve-like portion 2 and the conical or cone-like portion 4 there may be formed a material weakening, for example, a perforation (as shown, for example, in FIG. 2B) or a cross-section reduction (as shown, for example, in FIG. 2A).

At a second end 8 of the sleeve-like portion 2, there is arranged a retention portion 9 which is bent at right-angles away from the sleeve-like portion 2 and which thereby increases an outer diameter A of the sleeve-like portion 2 and forms planar abutment faces 10, 11.

In this instance, a first abutment face 10 faces away from the sleeve-like portion 2, whilst the second abutment face 11 faces in the direction of the sleeve-like portion 2.

The retention portion 9 is preferably constructed in a round manner and may be constructed in a polygonal or oval manner in alternative construction variants.

Figure 2C:
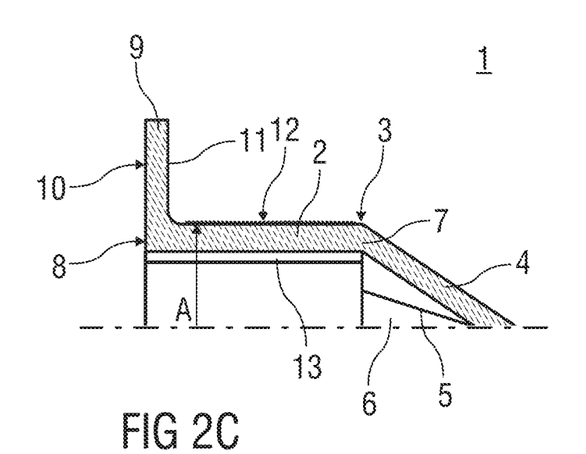
FIG. 2C is a schematic sectioned view of a securing element according to another embodiment.

The securing element 1 is preferably formed from a metal material and may have a surface structure 12 in the region of the sleeve-like portion 2 at the outer side. Such a surface structure 12 may, for example, be formed by a grain or corrugation (as shown, for example, in FIG. 2C).

In a particularly advantageous construction variant, a conventional inner thread 13 is formed on or in the sleeve-like portion 2.

Figure 3:
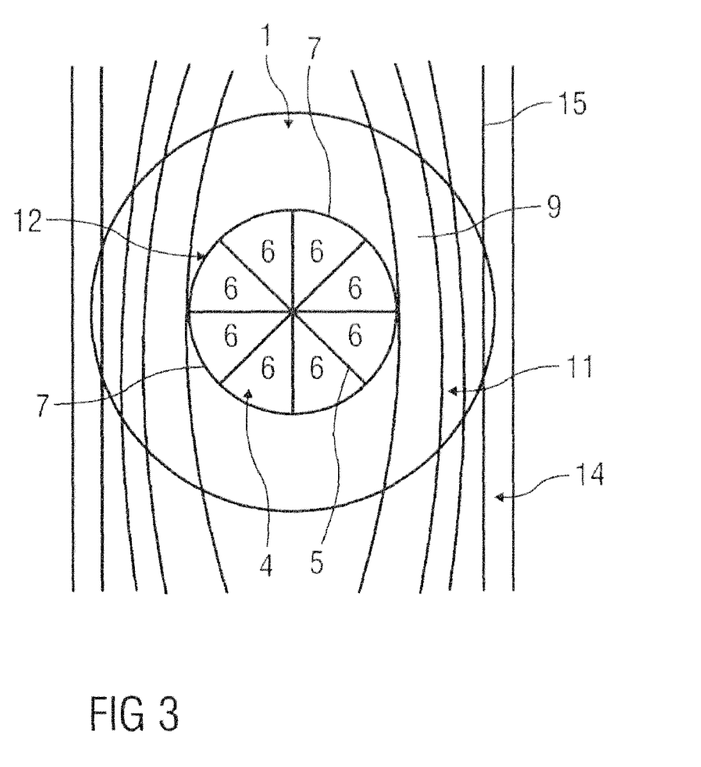
FIG. 3 is a schematic plan view of a securing element according to the invention which is arranged in a composite fiber component and a fiber path of fibers of the composite fiber component.

FIG. 3 is a schematic plan view of a securing element 1 according to the invention which is arranged in a composite fiber component 14 and a fiber path of fibers 15 of the composite fiber component 14.

The securing element 1 is arranged in a composite fiber component 14 by means of the method according to the invention. The composite fiber component 14 is preferably a planar semi-finished product of thermoplastic plastics material, in which a fabric of glass, carbon and/or aramid fibers or a mixed form thereof is introduced in such a manner that the fibers 15 are completely wetted with thermoplastic plastics material.

Such a composite fiber component 14 may, for example, be a seat structure of a vehicle seat, in particular a seat backrest rear wall of a so-called organic sheet.

In order to arrange the securing element 1 in a composite fiber component 14 in a positive-locking, materially engaging and/or non-positive-locking manner, a securing element 1 which is formed according to the invention is heated to a predeterminable temperature and in the heated state, beginning with the conical or cone-like portion 4, is pushed or pressed through the composite fiber component 14. In this instance, the predeterminable temperature is above a melting temperature of the thermoplastic matrix of the composite fiber component 14 so that this thermoplastic matrix is melted while the hot securing element 1 is being pushed through and during cooling forms a positive-locking, materially engaging and/or non-positive-locking connection with the securing element 1, in particular with the surface structure 12 thereof.

There is thereby formed between the securing element 1 and composite fiber component 14 a particularly robust and resistant positive-locking, materially engaging and/or non-positive-locking connection by means of which large forces can be introduced into the composite fiber component 14.

In this instance, the securing element 1 is pressed into the composite fiber component 14 in such a manner that the second abutment face 11 of the retention portion 9 of the securing element 1 is in planar abutment with a first side 16 of the composite fiber component 14.

A length of the sleeve-like portion 2 is formed so as to correspond to a thickness of the composite fiber component 14 so that the conical or cone-like portion 4 of the securing element 1 protrudes beyond the composite fiber component 14 at the second side 17 thereof.

While the hot securing element 1 is pressed through the composite fiber component 14, the fibers 15 of the composite fiber component 14 are forced through the conical or cone-like portion 4 of the securing element 1 in such a manner that they are positioned around the sleeve-like portion 2 of the securing element 1 and thereby form a new fiber orientation, which enables a particularly advantageous force path, as illustrated schematically in FIG. 3. In this instance, this forcing of the fibers 15 is carried out in a particularly advantageous manner in a non-destructive manner.

Figure 4:
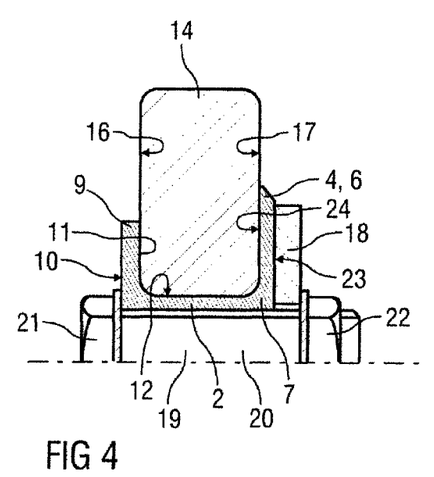
FIG. 4 is a schematic sectioned view of a connection between a composite fiber component and a structural element, which connection is produced by means of a securing element according to the invention in a first construction variant.

FIG. 4 is a schematic sectioned view of a connection which is produced by means of the securing element 1 according to the invention between the composite fiber component 14 and a structural element 18 in a first construction variant.

After the arrangement of the securing element 1 in the composite fiber component 14, in a first construction variant, a conventional screw 19 can be introduced into the sleeve-like portion 2, the shaft 20 thereof pressing apart individual segments 6 of the conical or cone-like portion 4. In this instance, the screw 19 is arranged in the securing element 1 in such a manner that a screw head 21 is in planar abutment with the first abutment face 10 of the retention portion 9 and the shaft 20 protrudes beyond the conical or cone-like portion 4.

When the structural element 18 to be secured is subsequently arranged and a conventional nut 22 is screwed onto the shaft 20 of the screw 19, the individual segments 6 of the conical or cone-like portion 4 are deformed to such an extent that they are bent at right-angles away from the sleeve-like portion 2 and thereby increase an outer diameter A of the sleeve-like portion 2 and form planar abutment faces 23, 24 of the segments 6.

In this instance, a first abutment face 23 of each segment 6 faces away from the sleeve-like portion 2 whilst the second abutment face 24 of each segment 6 is directed in the direction of the sleeve-like portion 2.

The structural element 18 to be secured is pressed onto the first abutment face 23 by means of the nut 22, the second abutment face 24 being pressed in this manner onto the composite fiber component 14.

Consequently, the angled elements 6 are arranged between the composite fiber component 14 and the structural element 18 to be secured and can thereby advantageously replace a conventional washer in the bent state.

A bending of the individual segments 6 of the conical or cone-like portion 4 can in this instance be supported by means of a material weakening in the transition region 7 between the sleeve-like portion 2 and the conical or cone-like portion 4 of the securing element 1.

Figure 5:
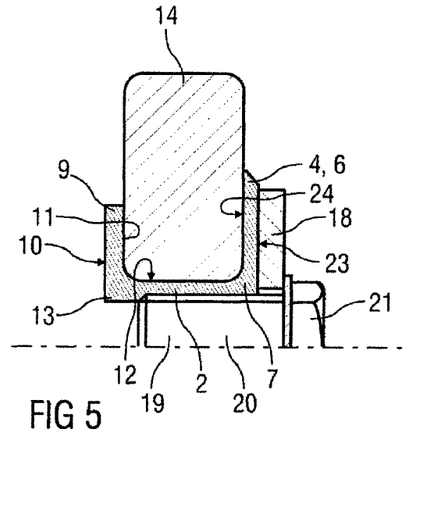
FIG. 5 is a schematic sectioned view of a connection between a composite fiber component and a structural element, which connection is produced by means of a securing element according to the invention in a second construction variant.

FIG. 5 is a schematic sectioned view of a connection produced by means of the securing element 1 according to the invention between the composite fiber component 14 and a structural element 18 in a second construction variant.

In this second construction variant, the individual segments 6 of the conical or cone-like portion 4 of the securing element 1 are bent by means of a mandrel which is not illustrated. On or in the sleeve-like portion 2 of the securing element 1, there is formed an inner thread 13 into which a correspondingly formed conventional screw 19 is screwed.

The screw head 21 presses the structural element 18 to be secured in a planar manner against the first abutment face 23 of the individual segments 6 of the conical or cone-like portion 4, the second abutment face 24 of the individual segments 6 thereby being pressed against the composite fiber component 14.

The structural element 18 to be secured may in this instance, for example, be constructed as a reinforcement sheet, lock housing, belt redirection member, rear seat backrest bearing or other functional element.

By means of such a connection between the securing element 1 and the composite fiber component 14, it is possible to transmit high forces which occur, for example, in vehicle seats in the event of a crash. Conventional connection elements have to either be embedded in the composite fiber component 14 in a complex manner during the production process thereof or be arranged on the composite fiber component 14 by means of screwing using a drilling operation, with the fibers 15 of the composite fiber component 14 being destroyed. The method according to the invention enables between the securing element 1 and composite fiber component 14 a positive-locking, materially engaging and/or non-positive-locking bond which does not destroy fibers, in particular with a force transmission between the securing element 1 and composite fiber component 14 being significantly improved.

LIST OF REFERENCE NUMERALS

1 Securing element
2 Sleeve-like portion
3 First end
4 Conical or cone-like portion
5 Slot
6 Segment
7 Transition region
8 Second end
9 Retention portion
10 First abutment face
11 Second abutment face
12 Surface structure
13 Inner thread
14 Composite fiber component
15 Fiber
16 First side
17 Second side
18 Structural element
19 Screw
20 Shaft
21 Screw head
22 Nut
23 First abutment face
24 Second abutment face
A Outer diameter

The invention claimed is:

1. A securing element for positive-locking, materially engaging and/or non-positive-locking arrangement on or in a composite fiber component comprising:
   a sleeve with an outer side and an inner side, wherein the outer side and the inner side are directly opposite each other through a wall of the sleeve,
   wherein the inner side of the sleeve includes an inner thread;
   an acutely tapering conical portion at a first end of the sleeve,
   wherein the conical portion includes a plurality of slots which are orientated in the direction of a longitudinal extent of the securing element and which consequently subdivide the conical portion into individual segments;
   a retention portion at a second end of the sleeve,
   wherein the retention portion is bent at right-angles away from the sleeve and which consequently increases an outer diameter of the sleeve and forms planar abutment faces; and
   a material weakening in a transition region between the sleeve and the conical portion.

2. The securing element as claimed in claim 1, wherein the material weakening is a perforation and/or a cross-section reduction.

3. The securing element as claimed in claim 1, wherein the outer side of the sleeve includes a surface structure.

4. The securing element as claimed in claim 3, wherein the surface structure is a grain and/or a corrugation.

5. A method of assembling the securing element as claimed in claim 1, wherein the securing element is heated to a predeterminable temperature which is above a melting temperature of a thermoplastic matrix of the composite fiber component and in the heated state is pushed or pressed through the composite fiber component in such a manner that a second abutment face of the retention portion of the securing element is in planar abutment with a first side of the composite fiber component and the conical portion of the securing element protrudes beyond the composite fiber component at a second side thereof.

6. The method as claimed in claim 5, wherein, while the hot securing element is pressed through the composite fiber component, the fibers of the composite fiber component are urged through the conical portion of the securing element so as not to be destroyed in such a manner that they are positioned around the sleeve of the securing element and a new fiber orientation is thereby formed.

7. The method as claimed in claim 5, wherein there is introduced into the sleeve a screw whose shaft presses apart individual segments of the conical portion which, when the structural element to be secured is subsequently arranged and a nut is screwed onto the shaft of the screw, are deformed to such an extent that they are bent at right-angles away from the sleeve and thereby increase an outer diameter of the sleeve and form planar abutment faces.

8. The method as claimed in claim 5, wherein the individual segments of the conical portion are bent by means of a mandrel, wherein there is formed on or in the sleeve of the securing element the inner thread into which there is screwed a conventional screw whose screw head presses the structural element to be secured in a planar manner against a first abutment face formed by the individual segments of the conical portion.

* * * * *